3,107,206
PRODUCTION OF GRAFT POLYMERS
Emile Clément Cottet, Paris, and André Claude Ducros, Lyon, France, assignors to Societe des Usines Chimiques Rhone-Poulenc, Paris, France, a corporation of France
No Drawing. Filed Aug. 25, 1958, Ser. No. 757,143
Claims priority, application France Sept. 2, 1957
16 Claims. (Cl. 204—154)

The present invention concerns a new process for grafting polymerisable monomers by irradiation on polymers in the solid state with the aid of corpuscular or electromagnetic ionising radiations.

It is known that when a polymer is subjected, in the presence of a polymerisable monomer, to the action of heat, polymerisation catalysts, ultra-violet rays or more especially corpuscular or electromagnetic ionising radiations, it is possible to obtain under certain conditions a grafted copolymer containing macromolecular structural units chemically bound together, the said copolymer representing a true compound polymer.

The use of corpuscular or electromagnetic ionising radiations for effecting this grafting has already been described. It is applicable in particular to grafting on shaped polymers i.e. filaments, films, woven fabrics and other shaped objects made from the polymers. It has been proposed for this purpose to coat the polymer (also called the "stem polymer") with liquid monomer or monomer in solution by dipping, spraying or condensation of saturating vapours and to bombard it with the aid of particles (e.g. photons, electrons, or neutrons), accelerated or not. In a variant of this process, the polymer is so irradiated as to create beforehand by radiolysis active centres on its surface, on which centres the grafting subsequently takes place, whereafter it is coated with liquid or dissolved monomer as previously stated, or is exposed to saturating or non-saturating vapours of the monomers.

In many cases the industrial application of these methods present difficulties. Moreover, when the coated polymer is irradiated, the layer of liquid or dissolved monomer may polymerise partially under the effect of the radiations to form an ungrafted homopolymer, the presence of which is troublesome.

According to the present invention, the grafting is effected by subjecting a stem polymer (as hereinafter defined), either as a raw material or as a shaped article, to corpuscular or electromagnetic ionising radiation while it is in contact with a polymerisable monomer wholly in the vapour phase. In other words, the stem polymer and the monomer vapour are in contact only under such conditions, as of temperature and pressure, that the latter cannot condense.

The degree of grafting may be regulated, for a given polymer and a given monomer, by varying the temperature of the enclosed space in which the grafting takes place, the irradiation dose and the duration of contact with the vapour of the monomer. The incorporation in the polymer, in the course of its manufacture or conversion into shaped objects, of small quantities of polymerisation catalysts, such for example, as lauroyl peroxide or benzoyl peroxide, facilitates the grafting by promoting the formation of active centres under the influence of the radiation.

It has furthermore been found that in many cases, especially when the gaseous medium containing the monomer vapour does not exert sufficient penetrating action on the surface of the polymer, it is useful, in order to increase the degree of grafting, to subject the surface of the polymer previously to softening with the aid of an appropriate solvent. The latter must not have an inhibiting action on the graft-copolymerisation. When it is desired to effect a grafting in depth, particularly good results are obtained if the vapour of the monomer is, under the operating conditions, appreciably soluble in the softening agent. The latter may be applied to the "stem polymer," by dipping, spraying, etc., or it may be incorporated in the course of the conversion of the polymer into shaped objects.

However, it has also been found that it is possible to adjust the extent of the grafting, in the sense of either an increase or a decrease, by a much more convenient method which involves no additional dipping or spraying operation, whereby any danger of deformation of the treated objects is at the same time obviated. This process is characterised in that the gaseous medium which acts on the stem "polymer" consists of a mixture of non-saturating vapours containing on the one hand the polymerisable monomer and on the other hand at least one non-polymerisable softening agent for the "polymer," which softening agent is compatible with the polymerisable monomer. By an appropriate choice of the softening agent, it is possible to improve considerably the penetration of the monomer which it is desired to graft on to the "stem polymer" and even to obtain a degree of grafting higher than that given by the previous softening procedure. In addition, it is possible by means of the new procedure to adjust readily the absorption of the softening agent by the "polymer." The process is not limited to polymerisable monomers which themselves have a penetrating action on the stem "polymer," but it also permits of grafting monomers which would be unusable alone by reason of an absence of penetrating power on the "polymer."

If, instead of the polymerisable monomer being mixed with an agent capable of promoting its penetration into the "polymer," it is diluted with vapours of a non-polymerisable substance having a lower penetrating action than itself, the degree of grafting is reduced.

The new process is extremely simple and flexible and only requires one installation. It may be applied, for example, in an enclosed space freed from air in which the polymer to be grafted is subjected to the chosen irradiation and to a current of the appropriate gaseous mixture arriving at a temperature lower than that of the polymer. Another method of carrying out the process consists in disposing the stem polymer in the upper part of an exhausted irradiated enclosed space, the vapour mixture being produced by evaporation of an appropriate condensed mixture not in contact with the stem "polymer," maintained at a temperature lower than that of a stem "polymer" and protected against radiation.

The invention can be applied to polymers generally, both synthetic homopolymers and copolymers obtained by condensation or addition polymerisation, with or without subsequent chemical modification such as alcoholysis, saponification, acetalisation or halogenation, and polymers of natural origin, such as regenerated cellulose, cellulose esters or ethers, and rubber.

There may be particularly mentioned the polyvinyl esters of organic and mineral acids, polyvinyl alcohol, polyvinyl acetals, solid polyolefines such as polyethylenes, polypropylenes, and polybutenes, polyisoprenes, polystyrene, polyacrylic and polymethacrylic esters, polyamides, straight and branched polyesters, cellulose esters, regenerated cellulose, and silicone polymers.

The monomers which can be employed in carrying out the invention are unsaturated polymerisable monomers having a sufficiently high vapour pressure at the temperature used for the grafting operation to ensure that there is present during the operation in the enclosed space in which the grafting takes place a sufficient quantity of monomer vapour for the grafting. We mention in particular vinyl acetate, vinyl propionate, vinyl chloride, acrylonitrile, styrene, acrylic and methacrylic esters, vinyl ethers, olefines of low molecular weight, notably ethylene and propylene, butadiene, isoprene, chloroprene, vinyl silanes and unsaturated polymerisable compounds containing in their molecule phosphorus, sulphur, nitrogen (vinylamines) or a halogen.

The corpuscular or electromagnetic ionising radiations employed in the present invention are more particularly corpuscular ionising radiations obtained with particle accelerators of known type or by bombardment of a metal plate with electrons of appropriate energy, or in a nuclear reactor, or the electromagnetic ionising radiations produced by a natural or artificial source such as a cobalt 60 source.

The non-polymerisable substances whose vapours may be included with the vapour of the polymerisable monomer in the gaseous medium surrounding the stem polymer, and which are intended to increase or decrease the penetrating power of the monomer on the surface of the polymer, are chosen having regard to the properties of the polymersiable monomer, especially its vapour pressure, as also its penetrating power on the stem polymer. If it is desired to increase the extent and depth of grafting, account is also taken of their compatibility with the polymerisable monomer, which promotes the penetration of the vapour of the latter into the complex consisting of the stem polymer and the additional substance.

By means of the process of the present invention, a perfectly regular grafting of the monomer on the whole surface of the polymer can be effected. In addition, little or no change in the appearance of this surface is observed, which is advantageous when the process is applied to filaments, films, woven fabrics and shaped objects.

The following examples illustrate a number of methods of carrying the invention into practice and the properties of the products obtained thereby. They do not limit it in any way.

*Example I*

2 cc. of vinyl acetate containing an appropriate polymerisation inhibitor are introduced into a glass tube 25 mm. in diameter and 250 mm. in length, and a film of glycol polyterephthalate 80 x 20 x 0.2 mm. is introduced into the upper part of the tube. The bottom of the tube is cooled to −40° C., and the tube is sealed in vacuo (0.2 mm. Hg). With the aid of sleeves designed to maintain the appropriate temperatures, the lower part of the tube is brought to and maintained at about 35° C. and the upper part containing the film at about 38° C., and the whole is subjected to radiation from a cobalt 60 source of 1,300 curies, the lower part containing the monomer being protected as effectively as possible against radiation, until an irradiation dose of 6 megaroentgens is reached. After this treatment, the surface of the film of glycol polyterephthalate has become slightly milky and swells in benzene, so that it can be stuck on surfaces of non-polar nature (inked surfaces of advertising panels). Neither the initial film nor the film irradiated with 6 megaroentgens in the absence of vinylacetate vapour exhibits these properties.

*Example II*

Into a glass tube having a diameter of 25 mm. and a length of 250 mm. are introduced 2 cc. of acrylonitrile to which has been added an appropriate polymerisation inhibitor. In the upper part of this tube is suspended a film of polyvinyl alcohol measuring 22 x 80 x 0.2 mm. which has just been cast from an aqueous solution and has been incompletely dried, so that it still contains 50% of its weight of water.

As described in Example I, the lower part of the tube is cooled to −40° C., and the tube is sealed in vacuo (0.2 mm. Hg) whereafter its lower part is heated to about 30° C., while its upper part containing the film is maintained at about 32° C. and subjected to radiation from a cobalt 60 source of 1,300 curies until an irradiation dose of 1 megaroentgen is obtained, which takes about 3 hours.

After this treatment, the polyvinyl alcohol film is completely insoluble in boiling water, while a standard film treated under the same conditions, but without irradiation, is immediately soluble in boiling water.

*Example III*

Into a tunnel consisting of a glass channel 1 cm. high and 5 cm. wide, the upper part of which is permeable to the radiation of accelerated electrons, is introduced a film of polyvinyl alcohol having a cross-section of 40 x 0.2 mm., which has previously been softened by passing it through cold water of which it retains 45% of its weight, at a speed such that each part of the film remains exposed to the action of the radiation for 7 minutes. There are passed through the said channel in the opposite direction to the film vapours of dilute acrylonitrile in a current of nitrogen. This channel is irradiated over 10 cm. of its length by the beam from a 500 kv. accelerator. The film leaving the tunnel has a sensitivity to boiling water considerably lower than that of the initial film.

*Example IV*

A film of cellulose acetate plasticised with a mixture of equal parts of triphenyl phosphate and methylphthalate and measuring 80 x 20 x 0.2 mm. is suspended in a glass tube having a diameter of 25 mm. and a length of 250 mm., the base of which contains 3 cc. of vinyl acetate. The tube, the lower part of which is maintained at −40° C., is sealed in vacuo and then subjected to irradiation with 2 megaroentgens produced by a cobalt 60 source. During this irradiation, the lower part of the tube is maintained at 24° C. and the upper part containing the film at 25° C.

After this treatment, the film remains completely transparent, but swells in benzene, while the standard film is completely insensitive to this solvent. This proves that grafting of polymeric chains of vinyl acetate on the film of cellulose acetate has occurred. The treated film also has better adhesive properties than the standard film and is particularly suitable for the hot glazing of engravings or photographs.

*Example V*

A plasticised cellulose acetate film is treated under the conditions indicated in Example IV, but the vinyl acetate in the tube is replaced by acrylonitrile.

After irradiation, the film, which has acquired a very slight yellow tint, is insoluble in acetone, while the untreated standard film, and film irradiated under the same conditions but in the absence of acrylonitrile vapours, are instantly soluble in this solvent.

The treated film has much higher resistance to solvents and impermeability to steam than the untreated film and the film irradiated with 2 megaroentgens in the absence of acrylonitrile vapour.

*Example VI*

A. Into a glass tube having a diameter of 25 mm. and a length of 250 mm. are introduced 3 cc. of the following mixture:

| | Volumes |
|---|---|
| Acrylonitrile | 93 |
| Water | 7 | and there is suspended in the upper part of the tube a previously weighed film of polyvinyl alcohol measuring 80 x 20 x 0.05 mm. at $Eh=50$ and $T=20°$ C.

The tube is sealed in vacuo and introduced into an irradiation chamber operating with a source of cobalt 60 of 1,300 curies, in which the upper part of the tube containing the film receives an irradiation dose of 1 megaroentgen, while the lower part containing the liquid mixture is protected against radiation. During this irradiation, the lower part of the tube is maintained at about 20° to 21° C. and the upper part at about 22° to 23° C. with the aid of appropriate devices.

After this treatment, the sealed tube is opened and the film is withdrawn. After establishment of equilibrium at $Eh=50$ and $T=20°$ C., the film is again weighed and a 35% increase in weight over its initial weight is observed. Its nitrogen content, which was nil at the commencement was found on analysis to be 7.2%. The appearance of the film is unaffected, but it has become insoluble in hot water (80° C.), in which the standard untreated film or the film irradiated with 1 megaroentgen under the above conditions, but in the absence of the acrylonitrile-water vapour mixture, rapidly dissolves.

B. If a similar film of polyvinyl alcohol is treated under the same conditions, but pure acrylonitrile is placed in the irradiation tube instead of the mixture of acrylonitrile and water, a weight increase of only 0.8% is observed. The appearance of the film is unchanged, but it is rapidly soluble in hot water (80° C.). This result remains the same if the period of irradiation is increased to 10 and even 20 megaroentgens.

C. A similar film of polyvinyl alcohol previously softened by dipping in cold water until its initial weight is increased by 40% is subjected to the same treatment as in B. It undergoes a further weight increase of 15% of the initial weight. The nitrogen content of the treated film reaches 3.6%. The film obtained is insoluble in water at 80° C. but owing to the previous softening its appearance is changed. It is blistered and much less flexible than the film obtained in case A.

If the results obtained in the three cases A, B and C of the foregoing example are compared, it will be seen that the grafting could not be effected in case B owing to the insufficient penetrating action of the acrylonitrile vapour alone on the polyvinyl alcohol film, but that it was promoted in cases A and C as a result of the action of the water, which is at the same time a solvent for acrylonitrile and a softening agent for polyvinyl alcohol. Comparison of cases A and C also shows that the former is more advantageous.

*Example VII*

A. Into a glass tube of length 250 mm. and a diameter 25 mm. are introduced 3 cc. of a mixture consisting of:

15 volumes of vinylmethyldichlorosilane
85 volumes of methylethyl ketone and a cellulose acetate film measuring 80 x 20 x 0.1 mm. is suspended in the upper part of the tube, which is thereafter sealed in vacuo.

The tube is then transferred into a irradiation chamber operating with a source of cobalt 60 of 1,300 curies, in which the upper part of the tube containing the film is irradiated for 20 minutes, which corresponds to an irradiation dose of 0.2 megaroentgen, while the lower part of the tube containing the liquid mixture is protected against the action of the radiation.

During the irradiation, the lower part of the tube is maintained at about 20–21° C. and the upper part at about 22–23° C. with the aid of appropriate devices.

When the irradiation has been completed, the sealed tube is opened. The treated film is unchanged in appearance, but its surface has become insensitive to the standard solvents for cellulose acetate, which rapidly dissolve the standard film, and has the characteristic water-repelling properties of silicon polymers. It is to be noted that this same cellulose acetate film irradiated with 0.2 megaroentgen, in the absence of the vapour emitted by the aforesaid mixture of vinylmethyldichlorosilane and methylethylketone, behaves in the same manner as the untreated standard film.

B. If test A is repeated by placing vinylmethyldichlorosilane alone in the irradiation tube, a treated film is obtained which remains sensitive to solvents for cellulose acetate and which has no characteristic water-repelling properties. This result remains the same if the duration of the irradiation is prolonged so that the dose received by the film reaches 1, 2 and even 5 megaroentgens. In the latter case, partial destruction of the film is observed, the film becoming fragile without being insoluble or water-repelling.

C. If test B is repeated with the cellulose acetate film previously swollen by dipping in methylethyl ketone until its initial weight is increased by 20%, there is obtained after treatment a film which is insensitive to solvents and has improved water-repelling properties as compared with an untreated standard film, but these properties are distinctly inferior to those of the film treated in accordance with A and, in addition, its appearance is changed by the previous softening in methylethyl ketone, whereby it acquires a crinkled appearance.

*Example VIII*

A. Into a glass tube 250 mm. long and 25 mm. in diameter are introduced:

1.5 cc. of acrylonitrile
0.5 cc. of water and there is suspended in the upper part of the tube a skein of polyvinyl alcohol fibres consisting of unitary fibres of 5 deniers. The tube is sealed in vacuo and introduced into the irradiation chamber operating with a source of cobalt 60 of 1,300 curies, in which the upper part of the tube containing the skein of polyvinyl alcohol fibres receives an irradiation dose of 1 megaroentgen, while the lower part of the tube containing the liquid mixture is protected against the radiation. During this irradiation, the lower part of the tube is maintained at 25–26° C. and the upper part of 28–29° C. with the aid of appropriate devices.

After this treatment, the sealed tube is opened and the skein of fibres is withdrawn, its appearance having remained unchanged. Its behaviour in boiling water was tested in comparison with:

B. Standard fibres of like constitution but untreated,

C. Fibres irradiated under the same conditions as under A, but without the mixture of acrylonitrile and water in the irradiation tube, D. Fibres irradiated under the same conditions as under A, but the mixture of water and acrylonitrile having been replaced by acrylonitrile alone, and E. Fibres irradiated under the same conditions as under D, but with previous softening by dipping in cold water, followed by suction drying, producing a swelling representing 50% of the initial weight of the fibres.

Fibres treated in accordance with A are insoluble in boiling water, even after 15 minutes. They are neither changed in appearance nor stuck together by this treatment and it is possible, after the latter, to separate the unitary fibres from one another.

The fibres treated in accordance with E are less resistant to boiling water than those treated in accordance with A. They are swollen and stick together, so that it is no longer possible to separate the unitary fibres after this treatment. The fibres treated in accordance with D are even less resistant to boiling water than those treated in accordance with E and dissolve therein after 3 minutes. The fibres treated in accordance with C dissolve instantly in boiling water, as also do the standard fibres B.

*Example IX*

A. A web of fabric 7 cm. wide and consisting of cellulose acetate yarn of 30 deniers is continuously passed through a tunnel subjected to the radiation from a particle accelerator of 800,000 ev. and consisting of a glass channel 2 cm. in height and 8 cm. in width, the upper part of which is permeable to the radiation of accelerated electrons.

A current of nitrogen saturated with acrylonitrile vapour obtained by bubbling nitrogen through acrylonitrile maintained at 20° C. is passed in the opposite direction through the tube, the tunnel and the fabric themselves being maintained at a temperature of 22° C.

The speed at which the fabric travels through the radiation from the accelerator is such that each part of the film remains in the beam of accelerated electrons for 30 seconds, which corresponds to an irradiation of about 1 megaroentgen. On leaving the tunnel, the fabric has much lower sensitivity to hot water and to washing than the untreated fabric, but it is extremely stiff owing to excessive grafting, as the result of the excessive penetrating action of the acrylonitrile vapour thereon.

It is not possible to eliminate this troublesome structural modification by a simple acceleration of the speed of travel under the accelerator because, owing to their fineness, the yarns of which the fabric are formed are almost instantaneously completely penetrated by the vapour of the polymerisable monomer.

B. If, on the other hand, the nitrogen is bubbled through a mixture of 10% of acrylonitrile and 90% of benzene, all other operating conditions remaining unchanged, a fabric is obtained which has fully retained its flexibility, which has a distinctly better resistance to washing in hot water than the untreated fabric, and which is quite satisfactory for all practical uses.

This limitation of the degree of grafting is due to the reduction of the penetrating power of the acrylonitrile vapours as a result of their dilution with the benzene vapour, which has no solvent or swelling action on cellulose acetate.

*Example X*

A. A polyvinyl alcohol film measuring 80 x 20 x 0.15 mm. is brought into equilibrium with an atmosphere having $Eh=50$ and $T=20°$ C. and weighed. This film is thereafter softened by being dipped into cold water, of which it absorbs 80% of its initial weight.

The softened film is then suspended in the upper part of an irradiation tube 250 mm. long and 25 mm. in diameter, into which there have previously been introduced 5 cc. of a mixture consisting of:

50% of methyl methacrylate
40% of alcohol
10% of water

The tube is sealed in vacuo and disposed in an irradiation chamber operating with a source of cobalt 60 of 1,300 curies. Only the upper part of the tube containing the film and maintained at 22–23° C. is subjected to the irradiation, while the lower part containing the above mixture is maintained at 21° C. and is protected against the radiation.

The irradiation is continued until a dose of 1 megaroentgen has been reached, and the tube is then opened. The polyvinyl acohol film has remained flexible and transparent. It shows a weight increase representing 80% of its initial weight and has become insoluble in boiling water, which rapidly dissolves the untreated standard film or the film irradiated with 1 megaroentgen under the above conditions, but in the absence of the vapour emitted by the mixture contained in the tube in case A.

B. If the above experiment is repeated under the same conditions, but replacing the mixture of Example A by methyl methacrylate alone, there is obtained a grafted film having the same weight increase in relation to the initial weight as in case A and insoluble in boiling water, but this grafted film is rigid and fragile, and the boiling water test reveals a heterogeneity in the sense that its surface is substantially unaffected, but its central part is soft and swollen by the water.

Such heterogeneity cannot be observed when the film treated according to A is plunged into boiling water.

The penetrating action of the mixed vapour emitted by the liquid mixture employed in case A has permitted a more regular grafting in depth to that in case B owing to the simultaneous presence of the water and alcohol vapours in the gaseous medium, the water acting as a softening agent for the polymer, while the alcohol promotes the penetration of the methyl methacrylate into the softened polymer.

*Example XI*

A. A polyvinyl alcohol film plasticised with 15% of glycerine and measuring 80 x 20 x 0.25 mm., which has been brought into equilibrium with the ambient atmosphere ($Eh=50$, $T=20°$ C.), is weighed and suspended in the upper part of the irradiation tube containing the mixture employed in Example V, test A. The tube, sealed in vacuo, is irradiated under the conditions of Example V with a dose of 1 megaroentgen.

The grafted film obtained is flexible and transparent, its surface is slightly matt, and it shows a weight increase of 25% in relation to its initial weight. It is insoluble in boiling water, which very rapidly dissolves the untreated standard film and the film irradiated with 1 megaroentgen under the above conditions but in the absence of the vapour given off by the liquid mixture.

B. The above test A is repeated, but the liquid mixture of methyl methacrylate, water and alcohol is replaced by methyl methacrylate alone. After irradiation under the conditions of case A, the grafted film shows a weight increase of only 4% over its initial weight, its surface having an irregular appearance with matt and transparent areas, while it dissolves when immersed in boiling water for several minutes.

The methyl methacrylate vapour alone, which has no penetrating action on the surface of the polyvinyl alcohol, has been unable to become grafted with sufficient regularity and depth on the said film.

C. Test A is repeated, except that there is introduced into the tube:

5 cc. of methyl methacrylate
1 cc. of water

The film obtained after irradiation shows a weight increase of 6% over its initial weight and is very considerably softened by boiling water, which indeed partially dissolves it. In contrast to what was observed in case A, Example VI, in which the polymerisable monomer (acrylonitrile) has an appreciable solubility in water and penetrates readily into the complex consisting of polyvinyl alcohol softened by steam, the surface of the polyvinyl alcohol filament, although penetrated and softened by the steam in the gaseous medium, has been unable to lend itself to grafting by the vapour of the methyl methacrylate, which is insoluble in water and has no penetrating power on the polyvinyl alcohol-water complex.

We claim:

1. Process for the production of a graft copolymer which is substantially free from homopolymer, which comprises subjecting a stem polymer which is in the solid state and swollen by a non-polymerisable swelling agent to the action of high energy ionising radiation in the presence of the unsaturated vapour of a polymerisable monomer.

2. Process according to claim 1, wherein the stem polymer is swollen before being subjected to the action of the said radiation.

3. Process according to claim 1, wherein the stem polymer is subjected to the action of the said radiation in an atmosphere which contains as essential constituents the vapour of a non-polymerisable swelling agent for the stem polymer and the unsaturated vapour of a polymerizable monomer.

4. Process according to claim 1 in which the unsaturated vapour of the polymerisable monomer is free from uncombined oxygen.

5. Process according to claim 1 in which the ionizing radiation has an energy between 0.4 and 1.4 mev.

6. Process according to claim 1 in which the stem polymer receives a dose of high energy ionizing radiation of 1.25 to 31 megaroentgens per cubic centimetre of stem polymer.

7. Process according to claim 1 wherein the stem polymer is a synthetic addition polymer.

8. Process according to claim 1 wherein the stem polymer is a synthetic condensation polymer.

9. Process according to claim 1 wherein the stem polymer is a polymer of natural origin.

10. Process according to claim 1, wherein the stem polymer is in the form of a shaped article.

11. Process for the production of a graft copolymer which is substantially free from homopolymer which comprises subjecting a stem polymer in the solid state to the action of high energy ionizing radiation of energy between 0.4 and 1.4 mev. at a dose of 1.25 to 31 megaroentgens per cubic centimetre of stem polymer in an atmosphere free from oxygen and containing as essential constituents the vapour of a nonpolymerisable swelling agent for the stem polymer and the unsaturated vapour of a polymerisable monomer.

12. Process according to claim 11 in which the polymerisable monomer is a compound containing at least one ethylenic double bond.

13. Process according to claim 12 wherein the stem polymer is a synthetic addition polymer.

14. Process according to claim 12 wherein the stem polymer is a synthetic condensation polymer.

15. Process according to claim 12 wherein the stem polymer is a polymer of natural origin.

16. Process according to claim 11, wherein the stem polymer is in the form of a shaped article.

References Cited in the file of this patent

UNITED STATES PATENTS

| | | |
|---|---|---|
| 2,895,891 | Miller | July 21, 1959 |
| 2,983,657 | Gabilly et al. | May 9, 1961 |

FOREIGN PATENTS

| | | |
|---|---|---|
| 750,923 | Great Britain | June 20, 1956 |
| 1,130,099 | France | Sept. 17, 1956 |

OTHER REFERENCES

Ballantine et al.: "Brookhaven National Laboratory Report No. 414," pages 1–14, October 1956.

Bevington: "Chem. and Ind.," April 6, 1957, pages 411 and 412.

Collinson et al.: "Chemical Reviews," pages 486–488, June 1956.